United States Patent Office 2,921,679
Patented Jan. 19, 1960

2,921,679

NOVEL FLOTATION PROCESS

John W. Moore, Corpus Christi, Tex., assignor to Columbia-Southern Chemical Corporation, Allegheny County, Pa., a corporation of Delaware No Drawing. Application February 26, 1957
Serial No. 642,342

4 Claims. (Cl. 209—166)

The present invention deals with recovery of potassium chloride from sylvinite ores or the like. It especially deals with an improved flotation process for recovering potassium chloride of commercially desirable purity from potassium chloride ores.

Described in the literature are many flotation processes designed to recover potassium chloride from the form in which it is found in nature, notably as a sylvinite ore. These flotations are of varying effectiveness, depending upon the nature of the ore and other considerations. Attempts to recover by flotation potassium chloride of purity satisfying commercial standards, e.g. of at least 95 percent purity, from sylvinite ores and the like which contain between 1 and 10 percent by weight calcium sulfate have not been fruitful. Usually, the recovered product is of substandard purity and/or the recovery of potassium chloride is inefficient.

It now has been discovered that recovery of potassium chloride of commercial purity from sylvinite ores or other ores of potassium chloride containing 1 to 10 percent by weight calcium sulfate may be simply and expeditiously achieved by first effecting selective froth flotation of calcium sulfate and thereafter recovering potassium chloride by a further froth flotation. These steps, it has been found in accordance herewith, are accomplished by careful control of the aqueous sylvinite ore slurry during the respective froth flotation steps. Not only is the potassium chloride so recovered of high purity, but upwards of 90 weight percent of all the potassium chloride in the ore is recovered as this high purity product.

According to this invention, sylvinite ore or like potassium chloride ore containing 1 to 10 weight percent calcium sulfate is slurried in aqueous medium, the pH thereof is adjusted to above 10, preferably between 11 and 12, and a flotation or collection agent is added. With the slurry at such pH, the calcium sulfate is selectively floated by froth flotation. After separating this froth predominantly comprised of calcium sulfate, the remaining slurry is adjusted to a pH below 9, and usually between pH 6 and 8. Upon further froth flotation of the slurry, the potassium chloride is selectively removed as the froth.

Sodium hydroxide or like alkali metal hydroxides such as potassium hydroxide are employed for the purpose of establishing the initial pH above 10. Other alkaline materials are also suitable, it however being preferred to use those which do not contaminate the system with ions other than those already present.

For reducing the pH to 9 or below, an acidifying agent is added, notably an inorganic acid or acid salt. Hydrochloric acid is the recommended acidifying agent. It offers the desirous opportunity for adjusting the pH without contaminating the system with ions other than those already present. Other acidifying agents such as sulfuric acid, sulfurous acid, sulfur dioxide, carbon dioxide and the like may however be used.

Most of the useful collection or flotation agents are chemical reagents of the cationic group. These cationic agents are the high molecular weight aliphatic amines and their water-soluble salts including the quaternary amine salts. Typical examples of such cationic flotation agents include aliphatic amines having a straight-chain alkyl group of 7 or more carbon atoms such as n-heptylamine, n-octylamine, n-nonylamine, n-decylamine, n-unidecylamine, n-dodecylamine, n-tetradecylamine, n-hexadecylamine and n-octadecylamine. Commercially available flotation agents of this type are usually the water-soluble acetate salts of a mixture of such amines. Flotation agents which are water-soluble acetate salts of these amines such as Armac TD sold by Armour and Company are especially effective in the performance of the present invention. Armac TD is understood to consist of the water-soluble acetate salts of n-hexadecyl, octadecyl and octadecenyl amines derived from tallow in the approximate weight proportions of 30, 25 and 45 parts by weight. This invention, it will be understood, includes the use of recognized flotation agents or cationic collectors other than those specifically herein enumerated.

The amount of flotation or collection agent usually ranges from 0.5 to 1.2 pounds per ton of ore in the aqueous slurry in which flotation is accomplished. Wide latitude in the quantity of flotation ore collection agent is possible. The exact state of subdivision of the slurry of sylvinite ore, the flotation or collection agent itself, and other conditions may make it advisable to employ more or less of the agent.

In a procedure illustrative of performance of this invention, sylvinite ore containing from 1 to 10 percent calcium sulfate by weight is slurried in water. In the normal course of operation, this water is saturated with the soluble components of the sylvinite ore, such as sodium chloride and potassium chloride, and hence the flotations are conducted in a slurry of sylvinite ore saturated with the soluble ore components. Prior to slurrying, the ore is first mechanically subdivided into small particles usually from minus 20 to plus 200 mesh. The pH of this sylvinite ore slurry is then adjusted to above 10, and more preferably is adjusted to a pH of 11 to 12, by the addition of a small quantity of sodium hydroxide. Once the ore slurry is at this prescribed pH, the flotation or collection agent is added. Under these conditions with aeration, selective flotation of calcium sulfate present in the sylvinite ore occurs. The froth is removed, the remaining slurry adjusted to pH 9 or lower, usually pH 6 to 8 by addition of small quantities of hydrochloric acid, further flotation agent is added, and the slurry is aerated. A second froth appears and is collected. This second froth is in the best operation refloated, and the refloated matter is usually regarded as product. Middlings, the material failing to froth in the reflotation treatment, may be recycled to a further frothing in which fresh sylvinite ore is treated.

Thus, the present invention departs from prior techniques for recovering potassium chloride from its natural state by froth flotation in the steps of first adjusting the pH of the medium in which froth flotation occurs to a pH above 10 to selectively remove calcium sulfate, and thereafter adjusting the remaining slurry pH to below 9 before effecting recovery of the potassium chloride. This departure and pH control has special significance in the treatment of sylvinite ores containing from 1 to 10 percent by weight calcium sulfate. Without proper pH adjustment in accordance with the herein enumerated principles, recovery by froth flotation of potassium chloride from sylvinite ores containing from 1 to 10 percent calcium sulfate by weight does not yield a sufficiently pure, commercially acceptable grade of potassium chloride. With prior practices, additional purification of potassium chloride recovered by froth flotation from sylvinite ores of the herein treated character is required. This additional purification is costly, both because additional processing is necessary and also because of further losses of potassium chloride.

Typical sylvinite ores with which the present invention is concerned are those comprised primarily of potassium chloride, sodium chloride and calcium sulfate, the latter comprising 1 to 10 percent, or higher, by weight of the ore. Other components may be found in the ores, but for the most part are present in minor concentrations. Normally, from 20 to 50 percent by weight of the ore is potassium chloride with the balance being primarily sodium chloride except for the calcium sulfate.

Practice of the present invention, and the valued results achieved thereby, is demonstrated by the following example:

*Example*

One pound of sylvinite ore containing by weight 33.3±1.1 percent potassium chloride, 64.6±1.5 percent sodium chloride and 2.5±0.6 percent calcium sulfate and of minus 20 to plus 150 mesh (about 75 percent minus 20 to plus 35 mesh) was placed in a flotation cell. 1500 cubic centimeters of an alkaline brine solution to which had been added 5 cubic centimeters of 5 weight percent sodium hydroxide and 3 cubic centimeters of a 5 weight percent Armac TD were charged to the cell. The cell contents were slurried for 3 minutes, and the cell filled to just below the overflow with further alkaline brine solution of the above composition. The slurry in the cell was at pH 11.4 due to the added sodium hydroxide. This slurry was aerated and the froth collected.

Analysis of this froth showed it contained over 75 percent of the calcium sulfate originally present in the ore.

Subsequent to removal of the froth, the brine solution remaining in the cell was decanted until 1500 cubic centimeters remained in the cell. Sufficient dilute hydrochloric acid (5 weight percent hydrogen chloride) was added until the slurry was neutral, pH 7. Some 3 cubic centimeters of a 5 weight percent solution of Armac TD was added and the slurry froth floated, with the initial froth collected, reslurried and froth floated a second time. The resulting product was 98.2 weight percent potassium chloride (high purity) and contained 92.5 percent of all the potassium chloride in the original slurry (high recovery).

In the absence of the above described pH control coupled with a selective froth flotation of calcium sulfate, potassium chloride of substandard purity is obtained, e.g. well below 95 percent purity.

The temperature of the slurry is conveniently that of process water but, of course, may be any temperature which admits of a slurry, avoids freezing or boiling. Thus, slurries are usually at 10° C. to 70° C.

Although the present invention has been described by reference to specific details of certain embodiments, it is not intended that the invention be construed as limited thereto except insofar as such limitations are included in the appended claims.

What is claimed:

1. A method of recovering potassium chloride from ores thereof containing at least one percent by weight of calcium sulfate sufficient to interfere with the recovery of high purity potassium chloride by froth flotation with cationic flotation agents which comprises suspending the ore in an aqueous body, adjusting the slurry pH to above 10, adding cationic froth flotation agent capable of providing for potassium chloride flotation at a slurry pH below 9, effecting selective froth flotation of calcium sulfate, separating the calcium sulfate froth, adjusting the remaining slurry to a pH below 9 and effecting froth flotation of potassium chloride using cationic froth flotation agent.

2. A method of recovering potassium chloride from ores thereof containing from 1 to 10 percent calcium sulfate by weight which comprises suspending the ore in an aqueous body, adjusting the slurry pH to above 10, adding an amine froth flotation agent capable of providing for the froth flotation of potassium chloride at a slurry pH of 6 to 8, effecting selective froth flotation of calcium sulfate, separating the calcium sulfate froth, adjusting the remaining slurry to pH 6 to 8 and effecting froth flotation of potassium chloride using an amine froth flotation agent.

3. The method of claim 2 wherein the pH above 10 is between 11 and 12.

4. A method of recovering potassium chloride from ores thereof containing from 1 to 10 percent calcium sulfate by weight which comprises suspending the ore in an aqueous body, adjusting the slurry pH to above 10, adding an amine froth flotation agent capable of providing for froth flotation of potassium chloride at a slurry pH of 6 to 8, effecting selective froth flotation of calcium sulfate from the slurry while it is at a pH above 10, separating the calcium sulfate froth, adjusting the remaining slurry to pH 6 to 8, adding further amine froth flotation agent and effecting froth flotation of potassium chloride.

References Cited in the file of this patent

UNITED STATES PATENTS

| | | |
|---|---|---|
| 2,222,330 | Weining | Nov. 19, 1940 |
| 2,340,613 | Perkins | Feb. 1, 1944 |
| 2,569,672 | Jackson | Oct. 2, 1951 |
| 2,757,796 | Schoeld et al. | Aug. 7, 1956 |